United States Patent [19]
DePuydt et al.

[11] 3,892,296
[45] July 1, 1975

[54] TRAILER HITCH AND BRAKE ACTUATOR ASSEMBLY

[75] Inventors: Frank A. DePuydt; Eugene P. Conradi, both of Des Moines, Iowa

[73] Assignee: Dico Company, Inc., Des Moines, Iowa

[22] Filed: Apr. 1, 1974

[21] Appl. No.: 456,902

[52] U.S. Cl. ............... 188/112; 188/3 R; 188/162
[51] Int. Cl. ............................................... B60t 7/20
[58] Field of Search ........ 188/3 R, 112, 162; 303/7; 280/428

[56] References Cited
UNITED STATES PATENTS

| | | | |
|---|---|---|---|
| 2,027,606 | 1/1936 | McFall | 188/112 |
| 2,039,509 | 5/1936 | Adams | 188/3 R |
| 2,779,443 | 1/1957 | Tucker | 188/112 |
| 2,969,857 | 1/1961 | Parkhurst | 188/112 |
| 3,204,725 | 9/1965 | McGraw, Jr. | 188/3 R |

FOREIGN PATENTS OR APPLICATIONS

| | | | |
|---|---|---|---|
| 1,172,810 | 12/1969 | United Kingdom | 188/112 |

Primary Examiner—George E. A. Halvosa
Attorney, Agent, or Firm—Rudolph L. Lowell

[57] ABSTRACT

The invention includes a pair of tubular telescoping members having limited relative longitudinal movement with one secured to a tractor and the other to a trailer. An electrically driven actuator unit has a linearly adjustable primary actuator member for the trailer brakes located within the rear end portion of the trailer tubular member for movable support of its front end within the tractor tubular member. An abutment member in the tractor tubular member is arranged in linear alignment with the primary actuator for selective abutting engagement therewith. A secondary actuator for the trailer brakes is movably supported on the trailer tubular member rearwardly of the actuating unit for connection to the rear end of the actuating unit. A control circuit for the actuating unit is selectively operable to move the primary actuator to defined positions providing for a movement of the secondary actuator to a first position wherein the trailer brakes are rendered inoperative; to a second position wherein the trailer brakes are operated in response to deacceleration of the tractor vehicle; and to a third position wherein the trailer brakes are fully applied and locked in a trailer parking position.

9 Claims, 10 Drawing Figures

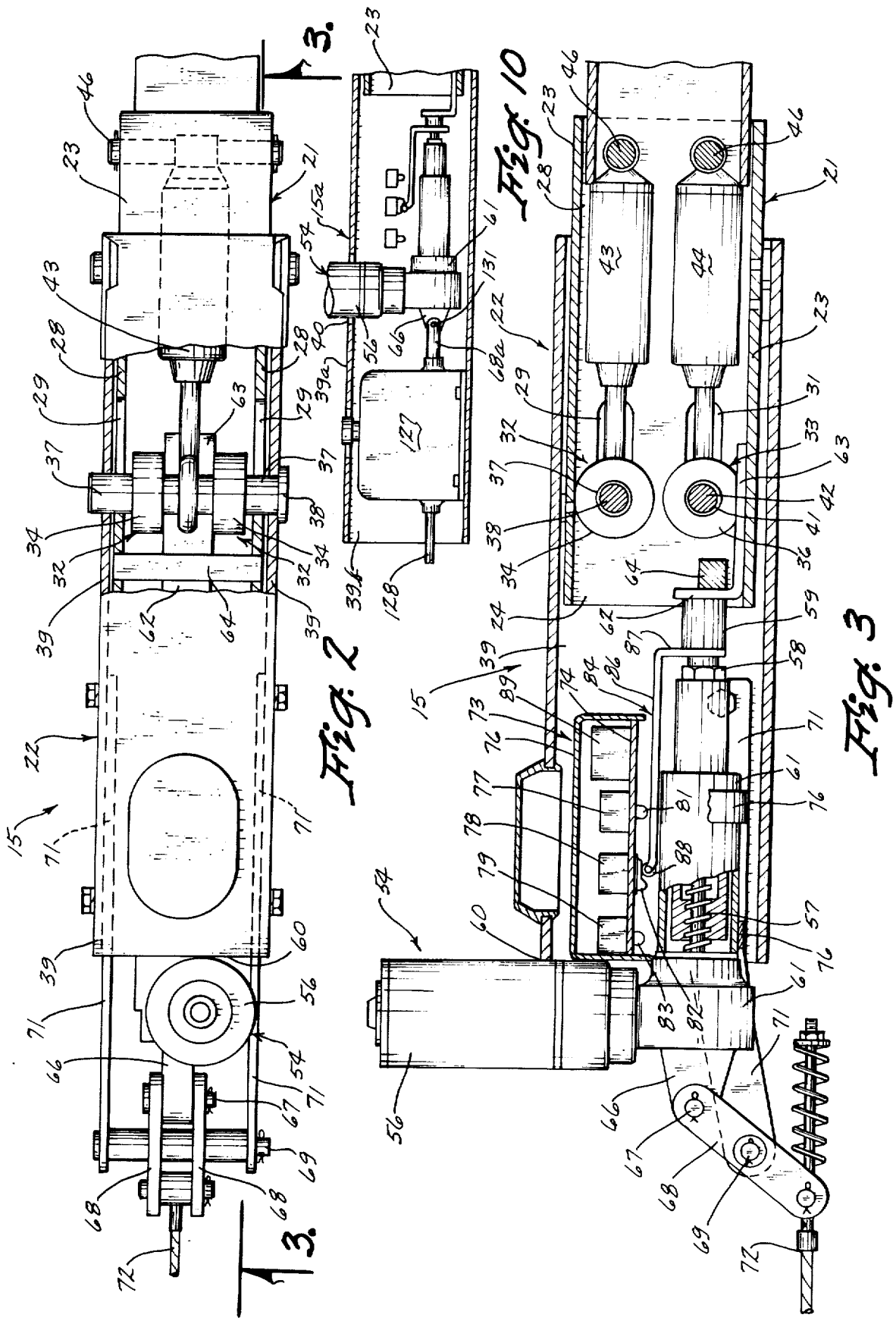

3,892,296

TRAILER HITCH AND BRAKE ACTUATOR ASSEMBLY

SUMMARY OF THE INVENTION

The trailer and brake actuator assembly is of a compact and simple construction and efficient in operation to safely control the braking of a trailer vehicle under all conditions of road travel. Adjustment or setting of the assembly to control the trailer brakes in accordance with traveling conditions is readily made by merely manipulating a main control switch that is located in the cab of the tractor vehicle. When the assembly is set for a surge type braking for operation in response to a deacceleration of the tractor, the trailer brakes are applied relative to the load characteristics of the trailer. For a trailer back-up operation, the trailer brakes are rendered inoperative to permit a free and unimpeded movement of the trailer. In this connection the trailer brakes may also be rendered inoperative during road travel when braking by the tractor engine alone is safe and adequate for trailer control. In parking the trailer the hitch and brake actuator assembly is adjusted to fully apply the trailer brakes and to lock the brakes in the applied position. Under conditions requiring a temporary drag application of the trailer brakes such drag operation is simply attained by applying the trailer brakes to any intensity necessary by merely alternating trailer brake application between a surge type operation and a parking operation. The drag on the trailer brakes is simply removed by adjusting the trailer and brake actuating assembly for a surge type braking operation. The invention is thus flexible for instant adjustment to apply varying braking actions on the trailer in accordance with encountered driving conditions.

BRIEF DESCRIPTION OF THE DRAWINGS

FIG. 2 is an enlarged top plan view of the hitch assembly;

FIG. 3 is a longitudinal sectional view of the hitch assembly with the parts thereof shown in positions to provide for a surge type braking operation of the trailer;

FIG. 10 is illustrated similar to the rear end portion of the tractor and hitch assembly in FIG. 3, and shows the assembly thereof with the master cylinder of a trailer hydraulic brake system.

DETAILED DESCRIPTION OF THE INVENTION

Figure 1:
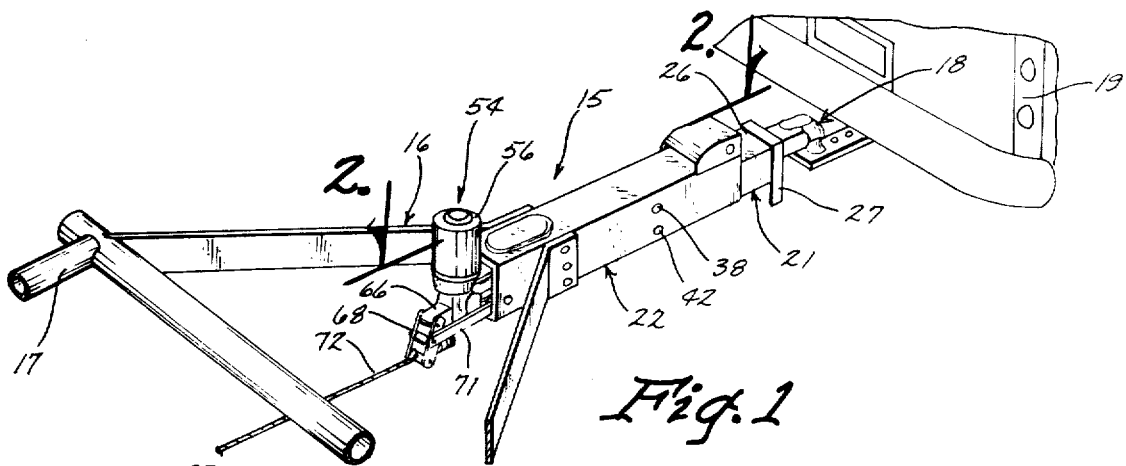
FIG. 1 is a perspective view of the trailer hitch and brake actuator assembly of this invention shown in assembly relation with the rear portion of the towing or tractor vehicle.

Referring to the drawing, the trailer hitch and brake actuator assembly of this invention, indicated generally at 15, is illustrated in FIG. 1 is an assembly relation with the tongue structure 16 of a trailer vehicle only the frame portion 17 of which is shown, and with a coupling 18 supported in a usual manner at the rear end of the tractor vehicle 19, illustrated as a passenger vehicle.

The hitch and brake actuator assembly 15, as best appears in FIGS. 2 and 3, includes a pair of inner and outer hitch units 21 and 22, respectively, with the inner unit 21 being telescopically received within the outer unit 22 for relative longitudinal movement. The inner hitch unit 21 includes a tubular casing member 23 open at its rear end 24 and having a front end 26 closed by a mounting plate 27 (FIG. 1) that carries the socket portion of the coupling 18. Spaced forwardly of the rear end 24 and formed in the side walls 28 of the tubular casing member 23 is a first pair of oppositely arranged longitudinally extended upper slots 29 (FIGS. 2 and 3). A second pair of transversely opposite longitudinally extended lower slots 31 are formed in the side walls 28 at positions below the first pair of upper slots 29.

Mounted within the rear end section 24 of the inner tubular member 23 (FIGS. 2 and 3) are roller assemblies 32 and 33 which include pairs of rollers 34 and 36, respectively. The roller assembly 32 has the rollers 34 thereof mounted on a sleeve bearing 37, the opposite ends of which are slidable in the upper slots 29. A shaft or bolt 38, extended through the sleeve bearing 37, has its opposite ends projected through the side walls of the outer tubular casing member 39 that forms part of the outer hitch unit 22. With the sleeve bearing 37 within the upper slots 29, it is seen that the rollers 34 are of a size to provide for their upper peripheral portions being engageable with the underside of the top wall of the inner tubular member 23.

The roller assembly 33 has the rollers 36 thereof mounted on a sleeve bearing 41 the opposite ends of which are slidable within the lower slots 31. The bolt or shaft 42 extended through the sleeve bearing 41 has its opposite ends extended through the side walls of the outer tubular member 39.

Located within the front end section of the inner tubular member 23 are a pair of longitudinally extended vertically spaced dash pot devices 43 and 44, the forward ends of which are pivoted on transverse pins 46 which extend between and are supported on the side walls 28 of the inner tubular member 23. The upper dashpot device 43 is connected to the roller assembly 32 and the lower dashpot assembly 44 is connected to the lower roller assembly 33 at positions located between the pairs of rollers 34 and 36, respectively. As is wellknown, the dashpot devices 43 and 44 function to reduce a hunting action between the hitch units 21 and 22 during a trailer towing operation.

The hitch and brake actuator assembly 15 (FIGS. 2 and 3) includes an electrically operated linear actuator unit 54 of a commercial type available from Duff-Norton Company, Inc. of Charlotte, N.C. 28201 as model MPD-6405-3. This unit includes an upright electric motor 56 operatively associated in a driving relation with a horizontal screw shaft 57. The screw shaft 57 in turn is in a driving relation with a linearly movable actuator member 58 that is extendible and retractible relative to the forward end 59 of a longitudinally extended housing 61 that forms part of the actuating unit 54.

In the assembly of the actuating unit 54 with the hitch units 21 and 22, the housing 61 is located within the rear end section of the outer tubular member 39 with the motor 56 projected upwardly at a position closely adjacent to the rear terminal face 60 of the tubular member 39. The front end 62 of the linearly movable actuating member 58 is provided with a flat forwardly projected axially off-set extension 63 which is slidably supported on the inner surface of the lower side of the inner tubular member 23 for guidable travel between and in contact engagement with the inner adjacent faces of the rollers 34. The actuating member extension 63 is movable below a transversely extended abutment member 64 which is secured to the tubular casing 23 adjacent the rear end 24 thereof and in linear alignment with the actuator member 58 for abutting engagement with the front end 62 thereof. For the purpose of convenience, the actuator member 58 will hereinafter be referred to as the "primary actuator" for a mechanical brake system (not shown) of the trailer vehicle.

A rearwardly projected extension 66 on the housing 61 is pivotally connected at 67 to the upper end of an upright pivoted secondary actuator member 68 for the trailer brake system. This secondary actuator is pivotally movable in a plane longitudinally of the housing and is pivotally supported on a transverse shaft 69 which extends between and is supported on the rear ends of a pair of transversely spaced mounting arms 71, the forward ends of which are secured to opposite side walls of the tubular member 39. As best appears in FIG. 2, the rear ends of the mounting arms 71 are arranged to opposite sides of the motor 56 and terminate rearwardly of the housing extension 66 with the pivot shaft 69 being located in the terminal ends of the arms 71.

The lower end of the secondary actuator member 68 is pivotally attached to one end of an operating member 72 the opposite end of which is operatively associated with the mechanical brake system of the trailer. The trailer brakes are applied or operated on movement of the secondary actuator 68 in a counterclockwise direction, as viewed in FIG. 3, and are released when the secondary actuator is moved in a clockwise direction, as viewed in the same figure. The back and forth movement of the secondary actuator to operate the trailer brake system takes place in response to the movement of the primary actuator 58 to a predetermined selected position by a controlled operation of the motor 56. Control of the motor is accomplished by means including a switch assembly 73 which includes a horizontal panel 74, suitably secured, as by a pair of strap members 76 to the housing 61.

The switch assembly 73 is located within the tubular member 39 at a position spaced above the housing 61 and has three switch units 77, 78 and 79 spaced longitudinally of the housing and equipped with corresponding actuators 81, 82 and 83, respectively, that project downwardly through the mounting panel 74. A common operating member 84 for the switch units 77, 78 and 79 is of a substantially L-shape with the long leg 86 thereof located between the mounting panel 74 and the top side of the housing 61 for guidable movement longitudinally of the housing 61. The short leg 87 projects downwardly for connection to the primary actuator 58 adjacent the forward end 62 thereof. In response to a linear movement of the primary actuator 58 a roller 88 at the terminal end of the long leg 86 is moved into and out of engagement with one of the switch actuators 81, 82 or 83. The switch units 77, 78 and 79 and a relay 89, located on the panel 74 forwardly of the switch unit 77 are enclosed by a cover or housing that is releasably attached to the mounting panel 74.

Figures 4, 5:
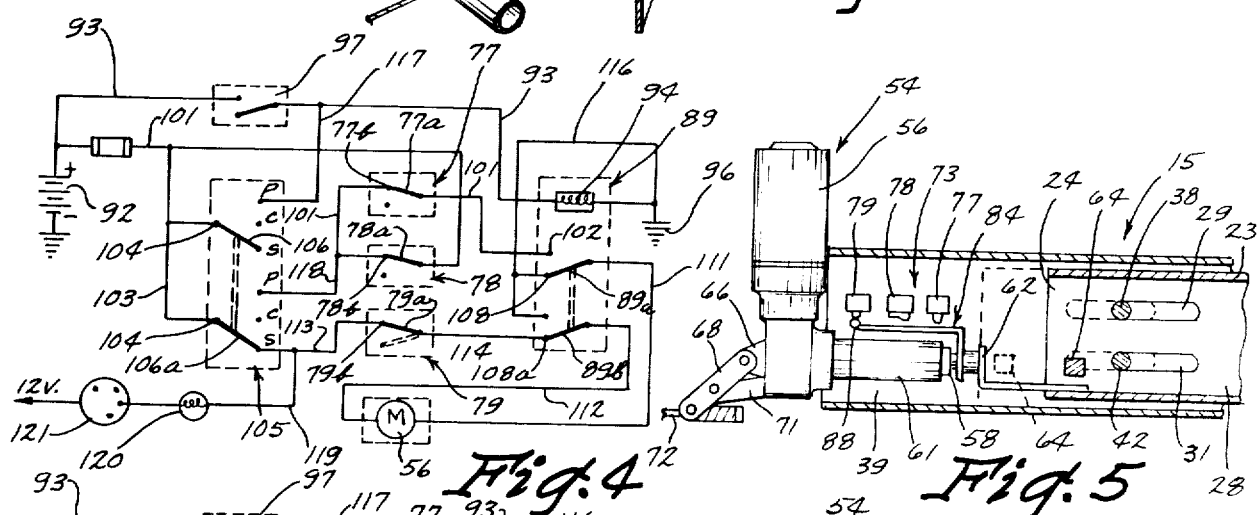
FIG. 4 is a diagrammatic showing of an electrical control circuit for the hitch and brake assembly with the parts thereof arranged to render the trailer brakes non-operative.
FIG. 5 is a diagrammatic showing of the rear portion of the hitch and brake assembly with the parts thereof in positions corresponding to the setting of the electrical circuit of FIG. 4.

A control circuit for the electrical actuating unit 54 is shown in FIG. 4 with the parts thereof being illustrated in moved positions providing for the movement of the primary actuator 58 to a fully retracted position within the housing 61, shown in FIG. 5, to render the trailer brake system inoperative for so long as the tractor brakes are not applied. With the actuating assembly 15 in the position of FIG. 5, the trailer vehicle is freely movable for backup purposes or a free trailing movement relative to the tractor vehicle. However, on application of the tractor brakes the assembly will automatically adjust itself to provide for a normal or surge brake operation, as will later appear.

Referring to FIG. 4, the control circuit is illustrated as including a twelve volt battery 92, having a lead line 93 for the coil 94 of the relay 89 connected to ground at 96. A normally open stop light switch 97 connected in the line 93 is closed on depression of the tractor brake pedal (not shown) to operate the tractor vehicle brake system. A second lead line 101 from the battery 92 has the switch units 77 and 78 series connected therein and terminates at a contact 102 of the relay 89. A feed line 103 from the feed line 101 has branch lines connected to the terminals 104 of a double pole double throw manually operated switch unit 10.

The switch members 106 and 106a of the manual switch 105 are concurrently movable to contact positions indicated as P, C and S wherein the positions P provide for the trailer parking brakes being applied, the position S for a normal or surge operation of the trailer brake system, and the position C an intermediate or center position relative to the positions P and S. The switch members 89a and 89b of the double pull, double throw relay 89 are in normally closed positions with relay contacts 108 and 108a, respectively. The switch members 77a, 78a and 79a for the switch units 77, 78 and 79, respectively, are in normally closed positions with corresponding contacts 77b, 78b and 79b. The motor 56, which is of a reversible type, has one side thereof normally connected through a line 111 to the switch contact 108 of the relay 89 and the opposite side thereof normally connected through line 112 to the relay switch contact 108a.

As shown in FIG. 5, the fully retracted position of the actuator member 58 is determined by the roller 88 having opened the limit switch 79 when the switch members 106 and 106a are in the positions S therefor shown in FIG. 4. Should the actuator member 58 be in a position other than the fully retracted position therefor, position S of the manual switch 105 will provide for such fully retracted position. Thus, let it be assumed that the roller 88 on the switch operating member 84 is in engagement with the actuator of either one of the switch units 77 or 78 and the trailer brakes are to be fully released or conditioned for back up operation. The manual switch is initially operated to move the switch contacts 106 and 106a (FIG. 4) to their S positions. In this S position, the circuit for the relay 89 is open at the stop light switch 97, whereby the relay switch members 89a and 89b remain in their normally closed positions in engagement with the contacts 108 and 108a, respectively. It will also be noted that the switch member 106 of the manual switch 105 is also open when the S position therefor.

However, in the S position of the manual switch the circuit for the motor 56 is closed from lead line 101 through the feed line 103, switch member 106a line 113, normally closed switch member 79a, line 114 through the normally closed switch member 89b of the relay 89, line 112 to the motor 56 and from the motor through line 11, normally closed switch member 89a and line 116 to the ground 96. This closed circuit provides for a reversed operation of the motor 56 to move the primary actuator 58 in a rearward direction to its retracted position defined by the engagement of the roller 88 with the switch actuator 83 of the limit switch 79. On opening of the limit switch 79 the above described motor circuit is opened by movement of its switch member 79a to the dotted line position therefor shown in FIg. 4.

As previously described, the shafts 38 and 42, corresponding to the roller assemblies 32 and 33, respectively, have the opposite ends thereof slidably received within the upper and lower slot 29 and 31, also respectively. Relative longitudinal movement of the tubular members 23 and 39, therefore, is limited in reversed directions by the longitudinal length of the slots 29 and 31. As best appears in FIG. 5, when the primary actuator 58 is in its fully retracted position, the abutment member 64 and front end 62 of the primary actuator 58 are spaced a distance apart greater than the length of the slots 29 or 31. On an advance of tractor vehicle 19 relative to the trailer vehicle 17, therefor, the inner tubular member 23 is extended forwardly relative to the outer tubular member 39 to a stop position defined by the engagement of the shafts 38 and 42 with the rear ends of corresponding slots 29 and 31, respectively. On the rearward travel of the tractor vehicle the outer tubular member 39 is moved rearwardly relative to the inner tubular member 23 to a position defined by the engagement of the shafts 38 and 42 with the forward ends of the slots 29 and 31, respectively, as shown in dotted lines in FIG. 5. With the relative movement of the tubular member 23 and 39, limited by the engagement of the shafts 38 and 42, with the opposite ends of their respective slots 29 and 31, the primary actuator is retained in a position out of engagement with the abutment member 64. The secondary actuator 68 is thus maintained in a brake releasing position for the trailer 17 extended upwardly and forwardly toward the motor 56. In other words, the tubular members 23 and 39 are in a lost motion connection, defined by the length of the slots 29 and 31, and with this lost motion being ineffective to provide for any abutting engagment of the primary actuator 58 with the abutment 64.

The trailer brakes are thus inoperative or fully released when the trailer is being backed up or when it is being towed in normal road travel without application of the tractor brakes. In this respect, it is to be noted that if the tractor vehicle is deaccelerated by using the engine thereof for braking purposes, as in down hill travel for example, the trailer brakes will continue to be inoperative.

Figures 6, 7:
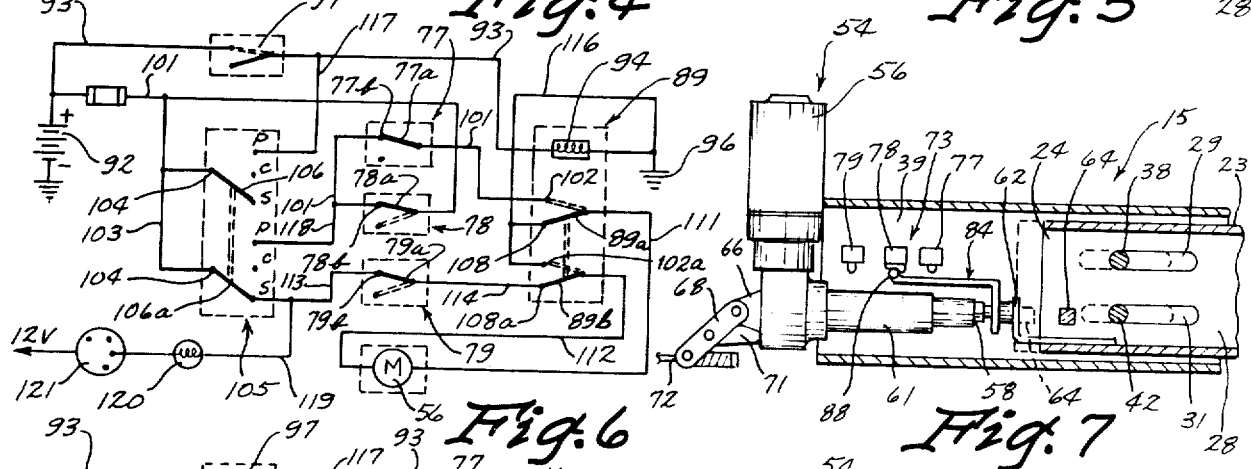
FIG. 6 is illustrated similaraly to FIG. 4 and has the parts thereof arranged to adjust the hitch and brake assembly for a surge type operation of the trailer brakes.
FIG. 7 is illustrated similarly to FIG. 4 and shows the hitch and brake assembly adjusted to positions corresponding to surge type operation adjustment of the circuit in FIG. 6.

To provide for a surge type operation of the vehicle brakes, the manual switch 105 is maintained in the position S, and the roller 88 is in engagement with the limit switch 79, to hold such switch open as illustrated in FIGS. 5 and 6. On applying the brakes of the towing vehicle the stop light switch 97 in the tractor brake light circuit, on depression of the brake foot pedal (not shown), is closed, as shown in dotted lines in FIG. 6, so as to energize the coil 94 of the relay 89 through the feed line 93 to the ground 96. On energization of the relay 89 the switch members 89a and 89b are moved to their dotted positions also shown in FIG. 6 in engagment with the relay contacts 102 and 102a. As a result of this engagement with the relay contacts 102 and 102a, the circuit for the motor 56 is closed through the feed line 101 and the normally closed limit switches 78 and 77, through switch member 89a, line 111 to the motor 56, and then through line 112 relay switch member 89 b and line 116 to the ground 96.

The closing of this circuit provides for a forward rotation of the motor 56 to provide for the linear extension of the primary actuator 58 forwardly the actuating unit 54, from its position shown in FIG. 5 to the position therefor shown in FIG. 7. This surge position of the primary actuator 58 is defined by the engagement of the roller 88 with the limit switch 78 to open the same, as illustrated in dotted lines in FIG. 6. This partially extended surge position of the primary actuator 58 provides for the front end 62 of the actuator being moved in contact with the abutment member 64 of the fully extended inner tubular member 23. As shown in FIg. 7, the fully extended position of the inner tubular member is defined by the engagement of the shafts 38 and 42 with the rear ends of the slots 29 and 31, respectively. In response, therefore, to a deacceleration of the tractor vehicle and resultant forward movement of the outer tubular member 39 relative to the inner tubular member 23, the actuating unit 54 is moved rearwardly relative to the outer tubular member 39.

This rearward movement of the actuating unit provides for the pivotal forward translatory movement of the secondary actuator member 68 in a counterclockwise direction relative to the pivot 69 as viewed in FIGs. 5 and 7 from its position in FIG. 5 to the dotted position therefor in FIG. 7. The lower end of the secondary actuator member 68 is thus moved forwardly to apply a pulling force on the operating member 72 for applying brakes on the trailer. It is seen, therefore, that the rearward linear movement of the actuating unit 54 relative to the outer tubular member 39, pivotally and linearly moves the secondary actuator 68 to apply the trailer brakes in response to an inertial surge of the trailer resulting from a deacceleration of the tractor.

It is to be noted that although the circuit for the motor 56 has been opened at the limit switch 78 to define the surge position of the linear actuator member 58, the circuit for the relay 89 continues to remain closed for so long as the stop light switch 97 is held closed. Thus, on a release of the brake pedal for the tractor braking system, and resultant opening of the stop light switch 97 to de-energize the relay 89, the motor 56 is reversely operated to return the primary actuaotr 68 to a trailer non-braking position. Since the limit switch 79, on disengagement from the roller 88, was permitted to move to its normally closed position, the reversing circuit for the motor 56 from the manual switch 105 is through the limit switch 79, relay switch member 89a, motor leads 112 and 111, relay switch member 89 and line 116 to the ground 96. On opening the limit switch 79 operation of the motor is stopped and the primary actuator 58 is returned to its position shown in FIG. 5.

Figures 8, 9:
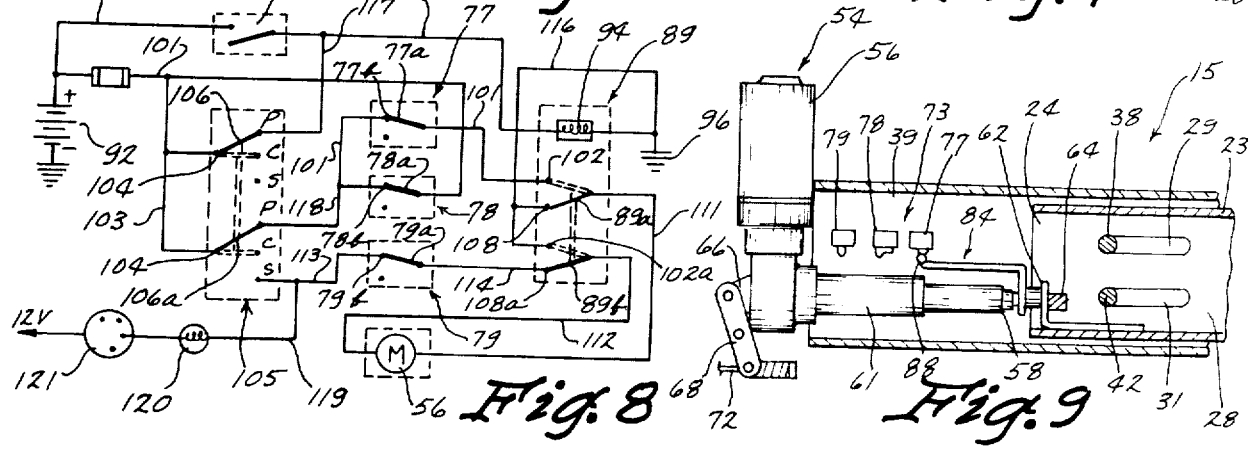
FIG. 8 is illustrated similarly to FIG. 4 and has the parts thereof in relative positions providing for a full application or parking brakes on the trailer vehicle.
FIG. 9 is illustrated similarly to FIG. 5 and shows the hitch and tractor assembly adjusted to positions corresponding to the circuit adjustment of FIG. 8.

To apply parking brakes on the trailer vehicle, the manual switch 105 is moved to its position P shown in FIG. 8 and held in this position for a matter of four or five seconds. On being released the switch 105 automatically returns to the center position C therefor. During the temporary depression of the switch 105 to its position P, the relay coil 94 is energized through a circuit which from the switch member 106, and as shwon in FIG. 8, includes a line 117 connected to the lead line 93 down stream from the stop light switch 97 of the tractor vehicle. Movement of the relay switch members 89a and 89b to their dotted line positions, as shown in FIg. 8, provides for a forward operation of the motor 56 through a circuit which, from the switch member 106a, of the manual switch 105, includes a line 118 connected into the lead line 101 at a position between the limit switches 77 and 78. The circuit then continues through the lead line 101, limit switch 77, relay switch member 89a, motor lines 111 and 112, relay switch member 89b and line 116 to the ground 96.

On engagement of the roller 88, with the limit switch 77, operation of the motor 56 is discontinued to define a fully extended position of the linear actuator 58, as shown in FIG. 9. In the extension of the primary actuator 58 to a fully extended position the actuator front end 62 initially engages the abutment 64. After this engagement has taken place the continued extension of the linear actuator 58 provides for the rearward movement of the actuating unit 54 relative to the tubular members 23 and 39. This rearward movement of the actuating unit 54 provides for hte linear translatory and counterclockwise movement of the secondary actuator 68 to its position shown in FIG. 9 corresponding to the appplication of full or park braking on theh trailer brake system.

With the motor 56 stopped, the linear actuator 58 is electrically locked in its extended position of FIG. 9 so as to positively hold the trailer brakes in a park position until released by a later operation of the motor. It is to be understood that the park position P of the manual switch is maintained only for a time sufficient to fully extend the primary actuator to its position of FIG. 9, after which it is automatically returned to the position C therefor. It is to be noted also that on return of the manually actuated switch 105 to the C position therefor, the circuit for the motor 56 remains open at the open limit switch 77. Should the trailer brake pedal be accidently applied to close the switch 97, the trailer brakes will remain in a park position since energization of the relay 89 is without any effect whatsoever on the open relay switch 77.

To the release the park position of the trailer brakes, the manual switch 105 is moved in position S whereby the reversing circuit for the motor 56 is closed through switch member 106a limit switch 79, line 114, switch member 89b, motor lines 112 and 111 and switch member 89a and line 116 to ground 96. This motor operation continues until the limit switch 79 is opened by the roller 88 to define the fully retracted position of the linear actuator shown in FIG. 5.

A brake drag on the trailer can be obtained by manipulating the manual switch 105 between the P and C positions therefor. Thus, the switch may be held in position P until the desired amount of trailer drag is felt, at which time the switch 105 is released for automatic return to the position C therefor. It is apparent, of course, that the amount of drag can be varied at the option of the vehicle operator. In this respect it is to be noted that the linear actuator 58 can be moved to any position between its retracted and fully extended positions, and that the moved position will be retained until the switch 105 is operated. When the need for a drag on the trailer brakes is no longer required, the switch 105 must be returned to position S for a normal operation of the trailer brakes.

As illustrated in FIGs. 4, 6 and 8, a pilot light 120 is carried in a line 119 connected at one end to the line 113 and at its opposite end to the switch 121 fo the ignition circuit of the tractor vehicle engine so that energization thereof takes place when the ignition is turned on and the manual switch 105 is out of the normal driving position S. Since the pilot light 120 is powered from the ignition circuit it is not energized when the tractor vehicle engine is shut off. The light 120 is carried on the instrument panel (not shown) of the tractor vehicle for ready observation by the vehicle operator. Whenever the light 120 is energized the operator will be warned that the switch 105 is out of its normal driving position S.

FIG. 10 shows a modified form of a hitch and brake actuator assembly which provides for the operation of a trailer brake system of hydraulic type. Since parts of the modified hitch and brake actuator assembly 15a are similar to parts in the hitch and brake actuator assembly 15, corresponding parts will be indicated by like numerals.

The inner tubular member 23 of the hitch and brake actuator assembly 15a is connected to the tractor vehicle 19 and telescopically received within an outer tubular member 39a that is secured to the trailer vehicle 17. The actuating unit 54 is located within the rear end section 39b of the tubular member 39a with the motor 56 thereof projected upwardly through an opening 40 formed in the top wall of the tubular member 39a. Also located within the rear end section 39b of the tubular member 39a and at a position rearwardly of the actuating unit 54 is a master cylinder unit 127 which is suitably secured to the tubular member 39a for movement therewith. A fluid line 128 extended rearwardly from the master cylinder 127 is fluid connected in a well known manner with the trailer hydraulic brake system (not shown).

The master cylinder 127 includes a forwardly projected piston rod or secondary actuator unit 68a for the trailer brake system. As is well known, on retraction of the piston rod 68a within the master cylinder 127, fluid under pressure is supplied through the fluid line 128 to apply the trailer brakes. This brake applying pressure is released when the piston rod 68 is yieldably moved forwardly from the master cylinder 127.

As illustrated, the front end of the piston rod or secondary actuator 68a is pivotally secured at 131 to the rear extension 66 on the housing 61 of the housing 61 of the actuating unit 54. The piston rod 68a is shown in FIG. 10 in a fully extended position corresponding to retracted position of the primary actuator unit 58, shown in FIG. 5. With the primary actuator 58 and secondary actuator 68a thus relatively positioned and the switch 105 in the position S of FIG. 5, the hitch and brake actuator assembly 15a is set or conditioned to render the trailer brakes ineffective in response to any relative movement between the tubular members 23 and 39a.

With the manual switch 105 in its position S is FIG. 6, and the actuator 58 moved to its partially extended surge position, shown in FIG. 7, the position of the piston rod 129 relative to the actuating unit 54 is unchanged from the positions shown therefor in FIG. 10. It is to be understood however that the front end 62 of the actuator 58 has been moved against the abutment member 64. Thus, on deacceleration of the tractor vehicle and resultant forward movement of the outer tubular member 39a, relative to the inner tubular member 23, the master cylinder 127 is movable with the member 39a relative to the actuating unit 54. This forward movement of the master cylinder provides for the retraction of the piston 68a within the master cylinder and the application of a high fluid pressure on the trailer brakes. This pressure is automatically released in response to the release of the tractor vehicle brakes and the resultant extension of the piston rod 68a.

When the manual switch 105 is in its trailer parking position P, shown in FIG. 8, the movement of the linear actuator 58 to its fully extended position shown in FIG. 9 results in the rearward movement of the actuating unit 54 relative to the master cylinder unit 127 whereby the piston rod 68a is depressed or retracted to apply and retain the brakes on the vehicle trailer.

It is seen, therefore, that the hitch and brake actuator assembly 15a operates in combination with the secondary actuator 68a of the master cylinder unit 127 in all respects similar to the operation of the assembly 15 relative to the secondary actuator 68 as described in connection with FIGS. 2 and 3. In this respect, it is to be understood that a drag brake can be applied on the trailer by the hydraulic brake system in all respects similar to such operation described in connection with the hitch and brake actuator assembly 15.

Although the invention has been described and illustrated with respect to preferred embodiments thereof, it is to be understood that it is not to be sollimited since changes and modifications can be made therein which are within the full intended scope of this invention as defined by the appended claims.

We claim:

1. A hitch and trailer brake actuator assembly for use between tractor and trailer vehicles comprising:
  a. a pair of tubular telescoping members a first one of which is secured to the tractor vehicle and a second one of which is secured to the trailer vehicle,
  b. a power actuating unit includiing an electric motor and a primary actuator member for the trailer brakes located within the rear end portion of said second telescoping member, said primary actuator member driven by said motor for extendible and retractible linear movement relative to the front end of said actuating unit,
  c. a secondary actuator member for said trailer brakes movably supported on said second telescoping member at a position rearwardly of said actuating unit,
  d. means operatively connecting said second actuator member with said trailer brakes,
  e. means movably connecting said secondary actuator member with the rear end of said power unit,
  f. an abutment member on said first telescoping member and adjacent the rear end thereof in a position for abutting engagement with said primary actuator member,
  g. coacting means for limiting relative longitudinal movement between said pair of telescoping members and
  h. a control circuit for said electric motor incuding switch means for operating said motor to move said primary actuator to predetermined positions relative to said abutment member to provide for movement of said secondary actuator member to corresponding positions wherein the trailer brakes are operable in response to deacceleration of the tractor vehicle, are rendered inoperative, or are operated for parking the trailer vehicle.

2. The hitch and trailer brake actuator assembly according to claim 1 wherein:
  a. said switch means includes a plurality of limit switches for opening said circuit primary actuator member, said limit switches mounted on said power unit in a spaced relation longitudinally of said primary actuator member,
  b. a switch actuator on said primary actuator member separately engageable with said limit switches, and
  c. a manually operated pre-selected switch unit for initiating the operation of said motor 3. The hitch and trailer brake actuator assembly according to claim 1 wherein:
  a. said control circuit includes a stop light circuit for said tractor vehicle, and
  b. a relay in said stop light circuit including switch means in said control circuit that are operable on closing of the stop light circuit that are to provide for the operation of the electric motor to move the primary actuator member to said predetermined position wherein the trailer brakes are operated in response to deacceleration of the tractor vehicle.

4. A hitch and trailer brake actuator assembly for use between tractor and trailer vehicles comprising:
  a. first and second axially telescoping tubular members, said first tubular member attachable to the tractor vehicle, and the second tubular member attached to the trailer vehicle,
  b. coacting means on said first and second tubular members for limiting the relative longitudinal movement therebetween,
  c. an actuating unit located within the rear end portion of said second tubular member, including an actuator retractible and extendible from the front end thereof,
  d. an upright pivoted secondary actuator member,
  e. means pivotally supporting said secondary actuator member on and rearwardly of said second actuator member for pivotal movement about an axis extended transverely of said second tubular member,
  f. means pivotally connecting the rear end of said secondary actuator member,
  g. an abutment member on said first tubular member engageable with the outer end of said primary actuator member, h. an operating member for said trailer brakes attached to the lower end of said secondary actuator member, and i. control means for said actuating unit to selectively retract said primary actuator member out of the movement limiting range of said coacting means to render said trailer brakes inoperative in response to relative movement between said tubular members; to partially extend said primary actuator member for engagement by said abutment member in response to a relative longitudinal movement between said tubular members; and to fully extend said primary actuator member to move said actuating unit rearwardly relative to said two tubular members to operate said trailer brakes to a parking position therefor.

5. A hitch and trailer brake assembly for use between tractor and trailer vehicles comprising:

a. first and second telescoping members, said first telescoping member attachable to the trailer vehicle, and said second telescoping member to the tractor vehicle, b. an actuating unit having a linearly extendible and retractible primary actuator member extended longitudinally within the rear end of said first telescoping member, c. an abutment member within and adjacent the rear end of said second telescoping member engageable with the front end of said primary actuator member, d. a secondary actuator member moveably mounted on said first telescoping member at a position rearwardly of said actuating unit for movement in a path longitudinally of said first telescoping member, e. means connecting the rear end of said power unit to said secondary actuator member, f. means operatively connecting said secondary actuator member with said trailer brakes, g. coacting means on said first and second telescoping members to limit the relative movement therebetween so that when the primary actuator member is in a first fully retracted position therefor said abutment member is non-engageable with said primary actuator member, and h. control means for said actuating unit to move the primary actuator member from said first position to a second partially extended position and to a third fully extended position therefor, said primary actuator member in the second position therefor being engageable with said abutment member to provide for a forward movement of said first telescoping member relative to said actuating unit and second telescoping member on deacceleration of the tractor vehicle whereby said secondary actuator member is moved to operate the trailer brakes in response to a braking of the tractor brakes in response to a braking of the tractor vehicle, and said primary actuator member on movement to the third position therefor being movable against said abutment member to move said actuating unit rearwardly relative to said two telescoping members whereby said secondary actuator member is moved to operate the trailer brakes to a park position therefor.

6. A method for controlling the braking operation of a hitch and trailer brake assembly for use between tractor and trailer vehicles, wherein said assembly includes a pair of telescoping members a first one of which is secured to the tractor vehicle and the second one of which is secured to the trailer vehicle, said method comprising the steps of:

a. providing an abutment member adjacent the rear end of the first telescoping member, b. movably mounting a secondary actuator for the trailer brakes on the second telescoping member for forward and rearward movement relative to said second telescoping member, c. connecting the rear end of a primary extendible and retractible actuator member and movably supporting the front end thereof one said first telescoping member for abutting engagement with said abutment member, d. limiting the relative longitudinal movement between said first and second telescoping members, e. withdrawing the primary actuator member rearwardly to a retracted position wherein the front end thereof is out of an engaging position with said abutment member to render the trailer brakes inoperative at all relatively moved positions of said telescoping members, and then f. partially extending the primary actuator forwardly to a position wherein the front end thereof is engageable with the abutment member during the deacceleration of the tractor vehicle for moving the secondary actuator member rearwardly to operate the trailer brakes in response to said deacceleration.

7. The method for controlling the braking operation of a hitch and trailer brake assembly according to claim 6 including the step of:

a. extending the primary actuator member to a full forward position with the front end thereof being engageable with the abutment member during said extension to move the secondary actuator member to operate the trailer brakes to a vehicle park position independently of any relative movement between the telescoping members.

8. The method for controlling the braking operation of a hitch and trailer brake assembly according to claim 7 including the step of:

a. providing an electric motor for extending and contracting said primary actuator member having a control circuit with limit switches responsive to the extension and contraction of the primary actuator member for defining the retracted, partially extended and fully extended positions of the primary actuator member and a manually operated pre-selector switch unit for initiating operation of the motor to move the primary actuator member to the moved positions therefor.

9. The method for controlling the braking operation of a hitch and trailer brake assembly according to claim 8 including the step of:

a. operating the manually operated pre-selector switch unit during travel of the tractor and trailer vehicles, in any desired sequence and for varying time intervals depending upon the road conditions being encountered.

* * * * *